Dec. 23, 1958  J. M. CHRISTMAN ET AL  2,865,257
GEAR CHAMFERING MACHINE OF THE UNIVERSAL TYPE
Filed May 29, 1953  5 Sheets-Sheet 1

INVENTORS
JOHN M. CHRISTMAN
& WILLIAM H. BIBBENS.
BY
ATTORNEY.

Dec. 23, 1958  J. M. CHRISTMAN ET AL  2,865,257
GEAR CHAMFERING MACHINE OF THE UNIVERSAL TYPE
Filed May 29, 1953  5 Sheets-Sheet 3

INVENTORS
JOHN M. CHRISTMAN
& WILLIAM H. BIBBENS.
BY
ATTORNEY.

Dec. 23, 1958  J. M. CHRISTMAN ET AL  2,865,257
GEAR CHAMFERING MACHINE OF THE UNIVERSAL TYPE
Filed May 29, 1953  5 Sheets-Sheet 4

INVENTORS
JOHN M. CHRISTMAN
& WILLIAM H. BIBBENS.
BY
ATTORNEY.

Dec. 23, 1958   J. M. CHRISTMAN ET AL   2,865,257
GEAR CHAMFERING MACHINE OF THE UNIVERSAL TYPE
Filed May 29, 1953   5 Sheets-Sheet 5

INVENTORS
JOHN M. CHRISTMAN
& WILLIAM H. BIBBENS.
BY
Gregory S. Dolgorukov
ATTORNEY.

2,865,257

GEAR CHAMFERING MACHINE OF THE UNIVERSAL TYPE

John M. Christman, Grosse Pointe Woods, and William H. Bibbens, Huntington Woods, Mich.

Application May 29, 1953, Serial No. 358,506

7 Claims. (Cl. 90—1.4)

This invention relates to machines and methods for chamfering the end edges of teeth of various toothed elements such as gears and the like. The present application is particularly directed to an improved gear chamfering machine of the universal type.

The present application is a continuation-in-part of the co-pending applications of John M. Christman, Serial No. 137,420, filed January 7, 1950 for Methods and Means for Burring and Chamfering Gears, now U. S. Patent No. 2,668,480; Serial No. 232,630, filed June 20, 1951 for Gear Chamfering Machine and Clutch Means Therefor, now U. S. Patent No. 2,730,019; Serial No. 327,269, filed December 22, 1952 for Method and Apparatus for Chamfering Gears; and Serial No. 345,520, filed March 30, 1953 for Method and Apparatus for Chamfering Internal Gears, now U. S. Patent No. 2,758,512.

The above listed patents and co-pending applications of John M. Christman disclose methods and machines constructed to chamfer the end edges of gear teeth of work gears of definite dimensional specifications. These machines (except the machine of Fig. 23 of the above mentioned U. S. Patent No. 2,668,480) may be termed in accordance with the usage of the art as "special" gear chamfering machines, and they are intended for high quantity production. Each of such special machines is designed and built for a specific work part such as a gear. If attempt is made to accommodate a special machine of this type to chamfer a different gear than that for which it was originally constructed, it would require extensive alterations in the machine, which may not be economical to make. Therefore, such "special" machines are used only for those parts for which they have been originally constructed. The above holds true also for the machines of this general nature having two or more stations designed to accommodate two or more specific gears, that is, one type gear at each station, which machines are known to the trade as multiple station machines.

In view of the above condition, such special gear chamfering machines have been considered to be economical for use on parts that do not become obsolete for many years, or are chamfered in sufficiently large quantities. However, in instances where the number of gears to be chamfered was not sufficiently large, or where there were expectation of changes in the design of the gears, it was not considered economical to purchase such special machines designed for these particular gears, there being no expectation that the special machines so designed and constructed would be used for a sufficiently long time or on a sufficiently large number of parts to pay for themselves.

The above conditions brought about consideration of designing a universal machine which could be adapted for chamfering gears of various dimensional specifications and thus be used under the conditions explained above, and have, when set for a certain specific gear, the advantages of the special machines disclosed in the above listed patents and co-pending applications of John M. Christman. It was found, however, that construction of such a universal machine in accordance with the usual practice of the machine building industry would require provision of many adjusting means involving slides, adjusting screws, clamping devices, elevating blocks, etc., which would be very difficult for a job setter to adjust in the shop for a proper machine set-up, due to his not knowing or not having any guide for proper adjustments resulting or required by the engineering design of the work gear or similar work part. As a result, setting up such a machine for a definite job may involve long periods of adjustments and trials, with the machine standing idle, and finally setting up the machine in a manner which is not the best possible manner to produce the most uniform chamfer. Therefore, it has been the general understanding in this industry that a universal machine of a conventional type would not only be exceedingly complicated and expensive but would be wholly impractical. Even if the job setter had engineering qualifications enabling him to solve the mathematical problems involved and to do the graphical drawing board work where graphical analysis was required, the machine would be idle for such period of time as the job setter would be engaged in such engineering activity.

It should be appreciated that with respect to spaced chamfering cutters alone there is a number of certain critical space relationships for various gears, and means for spacing the cutters would have to be incorporated into the portion of the machine carrying such cutters, as well as incorporating other cutter adjusting means. Spacing of the cutters depends upon dimensional characteristics of a specific gear, and for each specific gear there is a certain most advantageous spacing of the cutter that must be computed or found graphically. Another requirement is the shape of the cutter's cutting edges; these edges must be of certain definite and developed predetermined configurations which depend upon the specific gear tooth, spacing of the cutters, and upon the angle at which the cutters engage the gear tooth edges to be chamfered. The angle of the cutter path must also be computed.

The above mentioned factors constitute matters of engineering computations and discretion rather than the matter of adjustments by a job setter in the shop. Being left to a mechanic in the shop, these matters may not be properly evaluated and the proper solutions of the engineering problems involved may not be found in the shop for the reasons stated above.

The above considerations of the engineering nature of the problems involved hold true also with respect to the fixtures adapted to receive and locate the work gear in a definite space relationship to the cutters. With respect to such fixtures, their function of locating the axis of the work gear properly and to position the face of the work gear to be chamfered with respect to the cutter in a proper plane, are also considerations of critical importance. Again these matters have been found not to be matters for shop adjustments but matters of engineering design.

In view of the above, those skilled in the art came to the conclusion that a universal machine of the above nature, even if designed and produced, would be so difficult to adjust and set up properly, that its usefulness in a manufacturing plant would be doubtful.

One of the objects of the present invention is to provide an improved gear chamfering machine operating on the principles disclosed in the above listed patents and co-pending applications of John M. Christman and including, if desired, various auxiliary mechanisms, which machine can be adapted for chamfering several types of gears of different dimensional specifications, which is to say, be universal in its nature, and which is constructed in such a manner that the nature of features of the machines left to adjustment in the shop are within the capabilities of an average job setter and when set by him, would inherently produce chamfers of desired nature, even when setting is done quickly under pressure of the work in the shop.

Another object of the present invention is to produce an improved gear chamfering machine of the universal type, constructed in such a manner that critical dimensional factors such as cutter spacing, cutter path angle, pilot gear, and work-holding fixture characteristics for a specific gear and constituting matters of engineering design are taken care of by predesigned sub-assemblies. Such sub-assemblies are designed on the drawing board to eliminate the need for many critical and puzzling machine adjusting means and constructed by the machine builder in his plant and then merely assembled to the machine by the user. Such assembling may be done quickly by the machine user when the need for chamfering such specific gear arises, with the necessity of making only one adjustment for tooth rolling action between the work gear and the pilot gear.

A further object of the present invention is to provide an improved gear chamfering machine of the universal type which machine can be readily and economically changed to accommodate gears having various numbers of teeth, various tooth pitches, and having straight teeth (spur gears) or spiral and helical teeth.

A further object of the present invention is to provide a universal gear chamfering machine and a simple gear-holding device or fixture for each one of the various gears to be chamfered therein, which fixture is readily changed and is precisely located on the machine without exercising special skills.

A further object of the present invention is to provide a universal gear chamfering machine and a simple cutter-holding device therefor that can be easily made for any specific gear and precisely located and assembled to the machine without special skill, and received by the machine, when so assembled, in a manner locating the cutters in precise spaced relation for the gear to be chamfered.

A further object of the present invention is to provide a universal gear chamfering machine and simple pilot gears therefor all having the same number of teeth as the indexing gear therefor and providing simple adjusting means to ensure proper tooth rolling action between the pilot gear and work gear to be chamfered.

A further object of the present invention is to provide a yielding pilot gear spindle, for preventing machine damage if an occasional pitch diameter of the work part exceeds the high work limit, or if the teeth of the work part are not concentric with the bore.

A further object of the present invention is to provide a pilot gear to accommodate or compensate for the angular relation of the pilot gear spindle axis and work holding arbor axis when the ends of the teeth of spiral gears are chamfered.

A still further object of the present invention is to provide an improved gear chamfering machine which is so simple that its construction, operation, maintenance and repair are easily understod by a workman of average skill.

A still further object of the present invention is to provide an improved gear chamfering machine of the foregoing character, which is simple and rugged in construction, safe and dependable in operation, and is relatively inexpensive to manufacture and to repair.

Further objects and advantages of this invention will be apparent from the following description and appended claims, reference being had to the accompanying drawings forming a part of this specification, wherein like reference characters designate corresponding parts in the several views.

It is to be understood that the invention is not limited in its applicaton to the detals of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, a universal gear chamfering machine operating on the principle of the Christman machines disclosed in his above listed patents and co-pending applications, is constructed to have its cutter-carrying arm adapted to receive a block on which such cutters are spaced and otherwise positioned in a proper manner for a certain predetermined gear. This block is so designed that when placed on the machine in a manner in which the machine can receive it, it locates itself and the cutters in one predesigned position. This block is designed and built for the particular gear and is supplied to the user of the machine. In addition, the work gear-holding fixture is similarly designed for the same predetermined gear and is similarly made. Both the cutter-carrying block and the gear holding fixture designed and made for such predetermined gear are identified or marked in a similar manner and are supplied as a set by the builder of the machine to its user.

It is of importance that the machine disclosed in the present application has no adjustment means likely to confuse the set-up mechanic. The machine includes only the adjustment means which operate to produce proper rolling action between the teeth of the work gear and of the pilot gear. Any cutter block properly made to suit characteristics of a specific work gear has cutters of exact developed shape, with such cutters correspondingly spaced and located in a precise computed space relation to the cutter block. Such a cutter block unit can then be secured to the machine at only one non-adjustable location. Also, any work-holding fixture pre-designed to suit the work gear characteristics and the relationship of cutter edges to work tooth edges can be secured to the machine at one non-adjustable location. Considerable mathematical and graphical analyses are required for designing jointly the required cutter block and work-holding fixture in order to compensate for these non-adjustable conditions and yet have the tool path at the proper angle to the face of the work gear to produce a desired chamfer on the work gear teeth. The number of teeth, the tooth pitch size, spur and spiral, involute pressure angle, the size of the tooth chamfer, relation of the ends of the teeth to the locating surface are important factors that must be considered when designing these units. The design features deduced by analysis of such factors are built into the units for a specific work gear and need not be of any concern to the set-up mechanic.

The work gear indexing mechanism constitutes a permanent portion of the machine and may be adjusted within the machine to cause the pilot gear thereof to mesh with the work gear for indexing the same. Means are provided whereby the indexing device can receive various pilot gears adapted to have teeth capable of property meshing with the teeth of the work gear. A pilot gear is also provided as a part of the set and similarly identified. When the need for setting the machine for such predetermined gear arises, the user of the machine applies this set, namely, cutter-block, gear-holding fixture and pilot gear to his machine.

The machine constructed in the above manner and disclosed in this application can thus be adapted to chamfer the teeth of a large variety of gears having various dimensional specifications as to the number of teeth, pitch diameter, tooth pitches, etc. Both spur and spiral gears may be chamfered. A number of additional features of improvement are also provided in the machine. The work gear is precisely located in the machine, thereby ensuring uniform chamfer. The work-holding device, the block-and-cutters assembly and the pilot gear are easily changed by a workman of average skill. The adjustment device is simple and easily understood by a workman of average skill. The units of a set are constructed in such a manner that they can be easily assembled in a machine in only one precise position so that the work gear will be substantially uniformly chamfered.

In the drawings there is shown, by way of example, a universal gear chamfering machine constructed in accordance with the present invention. The drawings also illustrate various work gear holding fixtures, as well as tool set-ups available in the machine for chamfering work gears of various dimensional specifications and various types of teeth.

Figure 1:
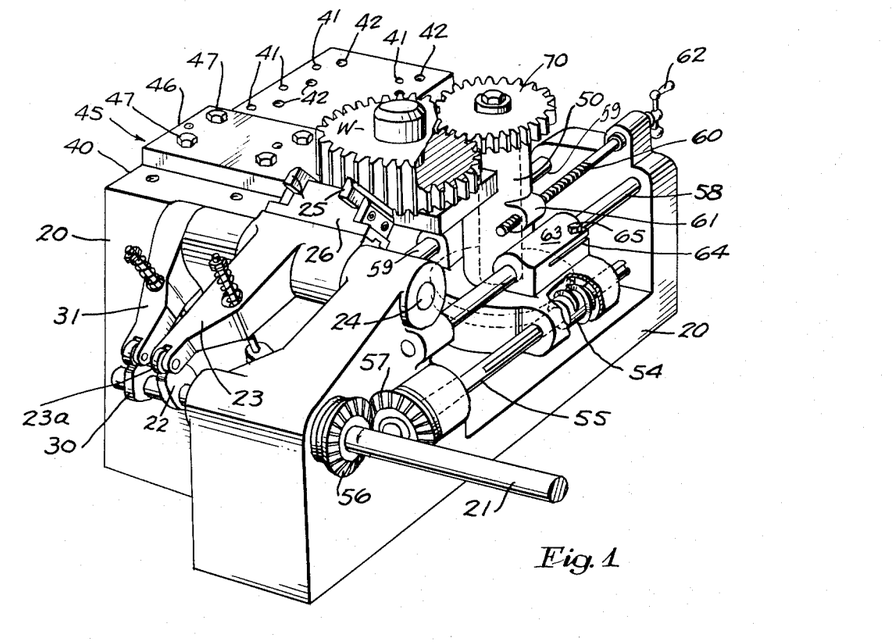
Fig. 1 is a perspective view illustrating a machine embodying the present invention.
Figure 2:
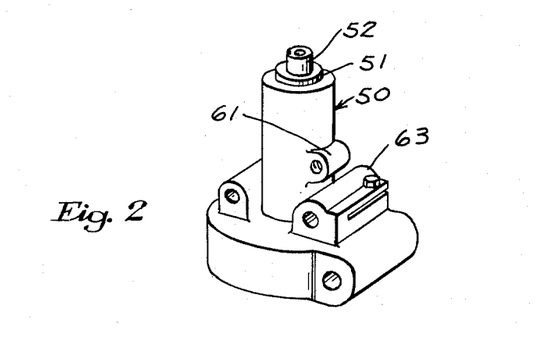
Fig. 2 is a perspective view showing a portion of the adjustable indexing mechanism removed from the machine.
Figure 3:
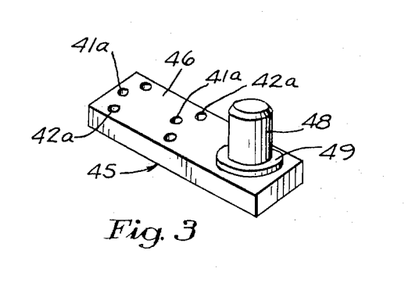
Figs. 3 and 4 show fixture means for straight tooth gears or spur gears, adapted to be made separately for gears of different dimensional specifications and assembled to the machine with the support therefor being provided only at one side of the fixture.
Figure 4:
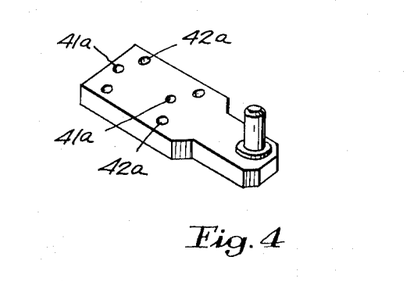
Figure 5:
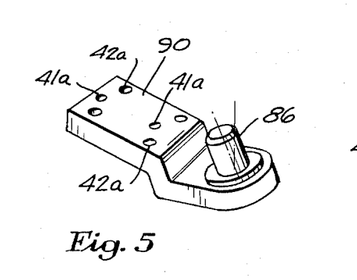
Figs. 5 and 6 are views similar in part to Figs. 3 and 4 but showing such fixtures for chamfering helical gears, with the gear arbors thereof being inclined at different angles to accommodate helical gears with different angles of helix.
Figure 6:
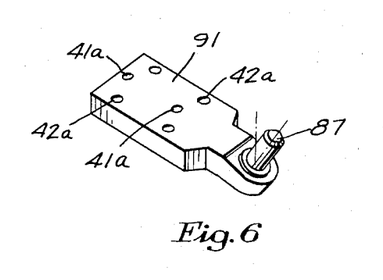
Figure 7:
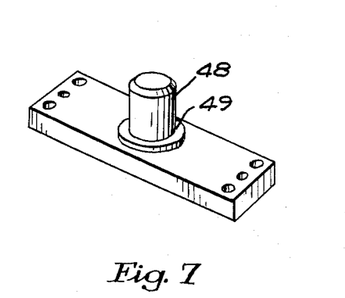
Figs. 7 and 8 show fixtures for the same gears as those for which fixtures of Figs. 3 and 6 are designed, but having supports at both sides of the gear-receiving arbors thereof.
Figure 8:
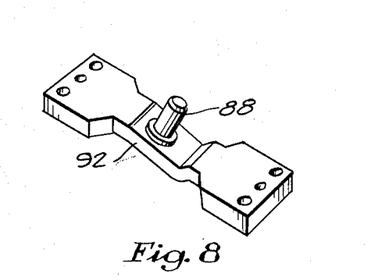
Figures 15, 16:
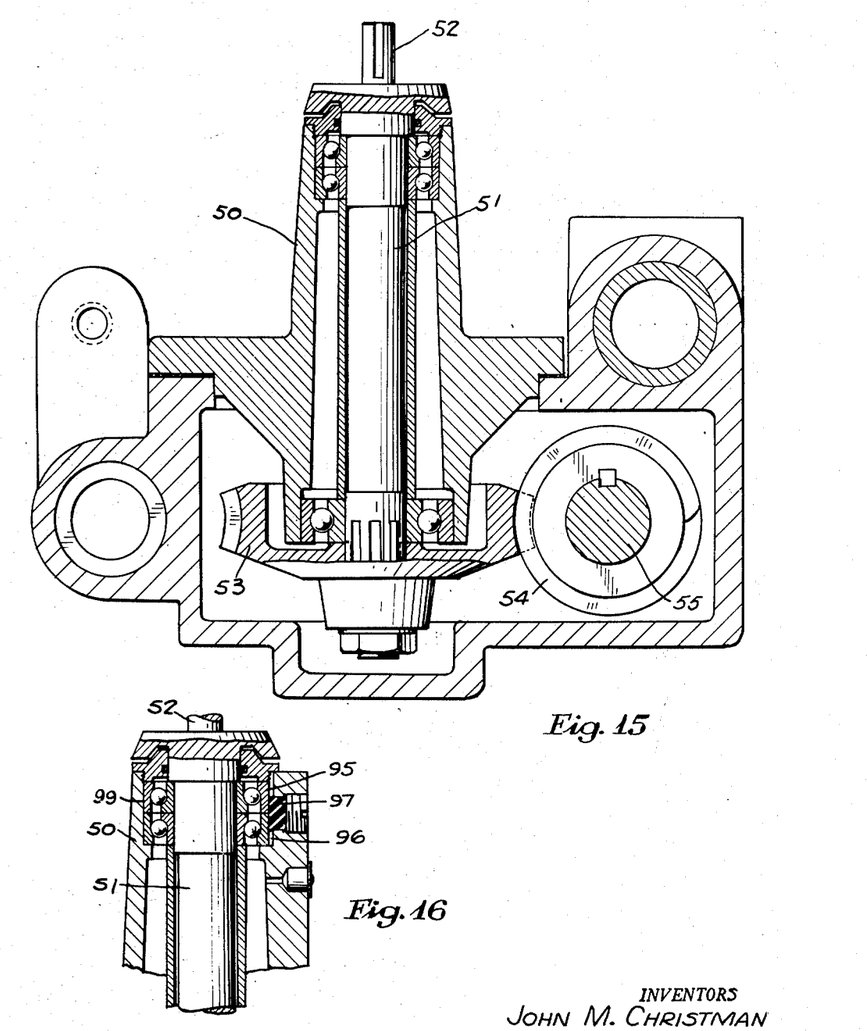
Fig. 15 is a sectional view of the construction generally similar to that of Fig. 2, the section being taken along the axis of the pilot gear arbor, but with more complete showing of the details of construction thereof.
Fig. 16 is a view showing the upper portion of the construction of Fig. 15 and including means for yielding or resilient suspension of the pilot gear arbor.

The machine illustrated in Fig. 1 has been somewhat changed in construction and arrangement of its parts for the sake of clearer illustration. For instance, the machine shown in Fig. 1 has an opened side exposing its interior to view. Also, in this machine the work holding fixture illustrated separately in Fig. 3 is supported at the left side of the machine only. In an actual machine it is preferable to have both sides of the machine closed and to provide supports for the work gear holding fixtures at both sides of the gear receiving arbor, which is to say, to receive and support fixtures such as shown, for instance in Figs. 7 and 8. Figs. 15 and 16 illustrate the device of Fig. 2 in section but showing in detail constructional features of one actual machine. Thus, Figs. 15 and 16 are, in effect, reproductions of certain working drawings for one such machine, while Figs. 1–12 are drawings specially prepared for the purpose of the present application with a view of illustrating the invention in the simplest and clearest possible way.

Referring specifically to Fig. 1, the machine illustrated therein comprises a frame structure 20 in which there is journaled in suitable bearings, a drive shaft 21 driven from any suitable source of power, not shown. On the shaft 21 there is mounted a cam 22 adapted to operate a swinging arm 23 through a follower-roller 23a carried by the end of said arm. The arm 23 is hinged on a shaft 24; therefore, as the shaft 21 rotates, the arm 23 oscillates through a predetermined angle, reciprocating two spaced cutters 25 mounted on a block 26 received by the opposite end of the swinging arm 23. The block 26 is connected to said arm with the aid of a positive connection adapted to locate and hold the block 26 on said arm 23 in only one operative position.

Thus, with the cutters 25 being located on the block 26 in a certain predetermined manner with respect to their spacing and distance from the shaft 24, as well as exact positioning of their cutting edges, the above mentioned connection also locates said cutting edges also in only one operative position on the arm. The block 26 and the cutters 25, as well as means for their positioning on the block 26, are predesigned and specially built for a gear of certain dimensional specifications.

The shaft 21 carries thereon a relief cam 30 operating a second swinging arm 31 actuating an eccentric connection between the shaft 24 and the arm 23 within one rotation of the shaft 21 and one cycle of operative movements of the cutters 25, for the purpose of relieving the cutters on their return stroke and for bringing them into the cutting position on the working stroke. This feature of the machine is described in detail in the above listed patents and co-pending applications of John M. Christman and need not be further described herein.

The supporting structure 20 includes a rigidly positioned locating surface 40 provided with a number of locating holes 41 and a number of tapped or connecting holes 42. A gear-holding fixture generally designated by the numeral 45 and illustrated separately in Fig. 3, is mounted on said surface 40. The plate 46 of said fixture 45 is provided with a number of locating holes 41a adapted to register with the locating holes 41 on the surface 40 for passage of locating or dowel pins therethrough. Connecting holes 42a are adapted to register with the corresponding tapped holes 42 on the surface 40 for connecting the plate 46 to the surface 40 with the aid of suitable bolts or screws, such as hexagon head cap screws 47. The opposite end of the plate 46 carries a gear-receiving arbor 48 chamfered at its upper end and provided at its place of juncture with the plate 46 with a shoulder 49 adapted to locate the lower face of the work gear.

It will now be seen in view of the foregoing, that with the fixture 45 designed together with the block-and-cutter assembly for a definite or specific work gear W, the machine will receive said fixture 45 and the work gear W loaded therein, only in one predetermined operative position with respect to the cutters 25 and their operative movements. Other positions of the gear W, if effected, would immediately prove themselves inoperative, either due to the lack of contact of the gear W with the cutters or due to its interference therewith. Moreover, locating holes 41 provided along surface 40 may be differently positioned with respect to their adjacent connecting holes 42, and the gear holding fixture 45 has its connecting holes designed for one specific set of holes on the plate 40. By virtue of such expedient, the work holding fixture 40 could not be located on the machine in any other position, operative or inoperative, but only one predetermined operative position.

Means adapted to index the gear W with respect to the operative strokes of the cutters 25 are of the construction generally described in the above listed patents and co-pending applications of John M. Christman and need not be described in further detail herein. In the machine disclosed in the present application, said means are made adjustable, and therefore, only so much of the construction thereof is disclosed herein as is necessary for a thorough understanding of this particular feature of said indexing means.

The indexing means comprise a housing 50 in which there is journaled, in suitable bearings, an indexing spindle 51 having an upper end 52 adapted to receive a pilot gear of desired specification and to drive the same with the aid of a slot-and-key connection. The lower end of the spindle 51 carries a worm gear 53 (see Figure 15) meshing with an interrupted worm 54 drivingly mounted on the shaft 55 by sliding along the same. The shaft 55 is driven from the shaft 21 with the aid of two miter bevel gears 56 and 57. The housing 50 is supported on the slide rails 58 and 59 and can be moved along the same with the aid of a screw 60 engaging a threaded lug 61 provided on the housing 50. The screw 60 is actuated manually with the aid of a crank handle 62. The bearing sleeve 63 engaging the slide rail 58 is slotted as shown at 64 and is provided with a tightening screw 65, with the aid of which the housing may be fixed in a desired position on the rails 58 and 59, as well as released for moving along said rails with the aid of the screw 60 for further adjustments, if necessary.

In the embodiment illustrated, the indexing means operate to index the work gear W one tooth at a time. However, indexing more than one tooth at a time may also be effected under conditions disclosed in said patents and co-pending applications.

The pilot gear, such as 70, engaging or meshing with the work gear W has the same number of teeth as the worm gear 53. However, for proper meshing with the work gear W a special pilot gear is provided in a set, together with a block-and-cutter assembly and work gear holding fixture, and is identified accordingly. The user of the machine may order such sets for definite work gears to be chamfered and the same can be easily designed and supplied to him by the machine builder. Thereupon, the user of the machine assembles the pilot gear, holding fixture, and cutter block to his machine any time he wishes to chamfer that particular gear, and makes only one simple adjustment for proper tooth rolling action between the pilot gear and the work gear. After the work is completed, these parts or subassemblies may be removed from the machine, making the same ready to be adapted for chamfering other types of gears.

In operation, the operator places a gear W to be chamfered on the arbor 48 against the stop 49 and starts the machine. Usually the machine need not be stopped for loading and unloading. However, since in chamfering some types of gears stopping of the machine may be desired, a clutch such as disclosed in the co-pending application of John M. Christman, Serial No. 232,630, now U. S. Patent No. 2,730,019 may be used in order to ensure that the cutters are stopped in their retracted position. When such a clutch is used, the motor need not be stopped for loading and unloading. A special signal light may be provided in the machine to indicate when chamfering is completed. Thereupon, the operator removes the chamfered gear and is ready to load another one into the fixture. The cutters make from five to eight strokes per second, and since the machine usually need not be stopped during the production run and since no clamping of the work gear is required due to the cutting action forcing the gear against the shoulder 49, ordinary gears may be chamfered at a rate of approximately 250–300 per hour. The work gear remains stationary while the cutters take a cut and return, whereupon the work is indexed one tooth and the cutter action is repeated. Such cutting and indexing continues until all teeth are chamfered.

Figure 13:
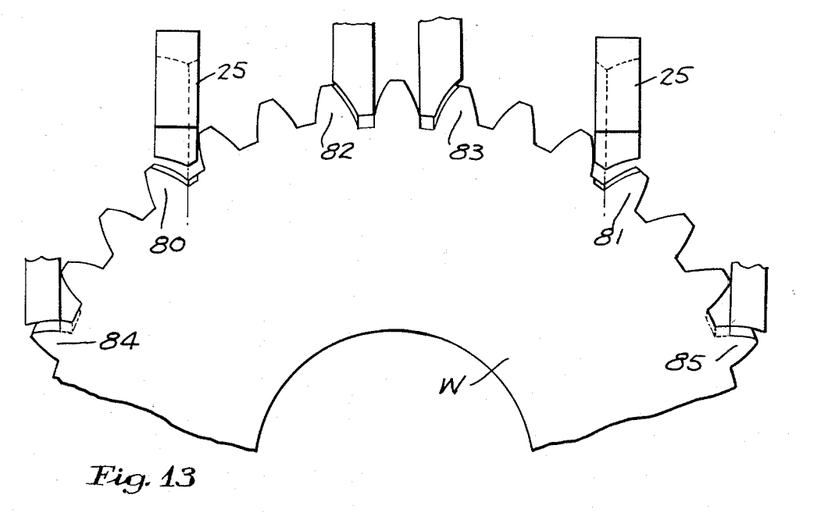
Figs. 13 and 14 illustrate the requirements for spacing the chamfering cutters.
Figure 14:
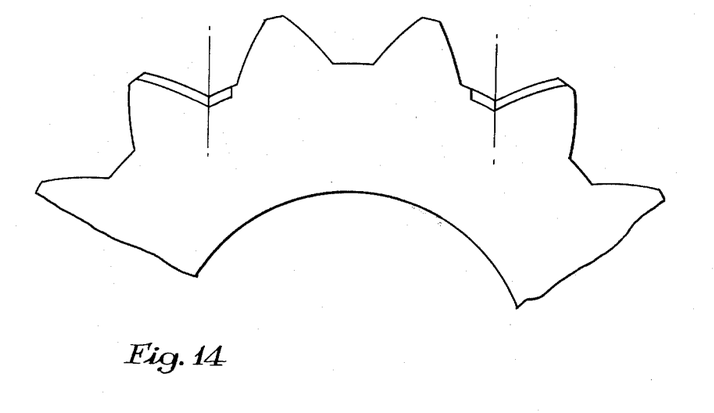

Referring to Fig. 13, it can be easily appreciated that the cutters 25 have to be spaced at a certain predetermined distance with respect to the teeth of the work gear W, in order to produce uniform chamfer on the meeting edges of the gear teeth, particularly the side and the root edges thereof. Such an advantageous position is illustrated in Fig. 13 with the cutters 25—25 chamfering teeth 80 and 81. If chamfering of teeth 82 and 83 is attempted, the chamfers on the root edges of the teeth will be much heavier, and chamfers on the side edges of teeth 82 and 83 will be much lighter, than desired. A reverse of this condition will result if chamfering of teeth 84 and 85 is attempted. It should be appreciated that usually it is desired to span as many teeth as possible with the cutters used and still be able to chamfer at least one-half of each of the adjacent root edges without interference. The gear of Fig. 14 is a rare exception to the above.

Thus, in designing and making the block-and-cutters assembly the problem of how many teeth should be spanned and what angle the cutter path should have in relation with the face of the gear, must first be solved. This problem is entirely too difficult for an average machine operator to solve or to compute. Even if such an operator, because of his special background, could solve such a problem, solving the same with the machine standing idle and losing time would be very uneconomical. It is more advantageous to make this problem one for a designing engineer to solve, since he can better understand that the cutter path extends along a plane that substantially bisects the angle formed by the side and the root edges of the tooth element, and that said cutter path being at an angle to the face of the gear determined by the cotangent of the last said angle being equal to the cosecant of the bisected angle when the chamfer on the work gear tooth edges is 45°. For example, if the angle formed by the side and root edges of the gear tooth is 111°, then the bisected angle is 55½°. The cosecant of 55½° is 1.2134, and 1.2134 also is nearly the cotangent of 39½°, the angle of tool path to face of gear when the chamfer on gear tooth edge is 45°. The cutter block is then constructed in such a manner that when it is secured to the machine, the cutters span the proper number of teeth and at the proper work tool path angle. As a result, the operator needs only to secure the pre-located block-and-cutters assembly to the machine in a manner described above.

Generally, a special pilot gear, such as 70, is made for each specific work gear. The pilot gear has the same number of teeth as the index gear, as mentioned. The pitch of the pilot gear teeth is the same as the pitch of the teeth in the work gear. The pilot gears are constructed so that when they are assembled on the indexing spindle 51, the work gear teeth will register with the straddling cutting tools or cutters 25. Means may be provided to adjust the pilot gear in the event more chamfer is desired on one side of the tooth than the other side. The pilot gear can be easily removed and reassembled without skill, to the index spindle for a future production run.

The pilot gear is manually positioned by the use of the adjusting screw crank handle 62, for the desired tooth rolling action with the work gear. This adjustment feature is highly desirable as the pilot gears do not have to be of a precise size, and if a pilot gear should wear with use, it can be adjusted to take out any undue backlash between the teeth.

Means are provided on the index spindle to allow the upper end to yield in the event a work gear pitch diameter exceeds the high limit, creating a possibility of a jamming condition which might injure the machine. Such means are illustrated in Fig. 16, wherein the outer race 95 of the bearing is nested with clearance 96 in a bearing recess. The rubber block 97 constitutes yielding means compensating for required movement of the spindle and bearing. As can be clearly seen from an examination of Fig. 16 the rubber block 97, in yielding to allow movement of the bearing race 95, thus provides for movement of said race away from the work gear and its spindle and, therefore, away from the surface 99 against which the bearing race 95 abuts under normal conditions, i. e. in the position shown in Fig. 16. In the position of the bearing race 95 shown in Fig. 16 the distance between the axes of the pilot gear and the work gear and of their respective spindles is at its minimum, since the surface 99 prevents movement of the bearing race 95 and of the spindle end 52 any closer to the spindle of the work gear.

Figures 9, 10:
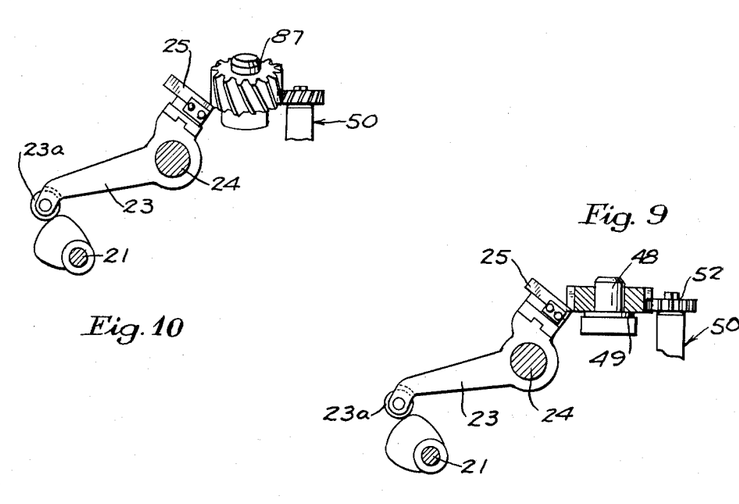
Fig. 9 shows a set up or arrangement of main parts of the machine for chamfering a spur gear in a fixture such as shown in Figs. 3, 4 and 7.
Figs. 10 and 11 illustrate set-ups for chamfering helical gears in fixtures such as shown in Fig. 6 and Fig. 5, respectively.
Figures 11, 12:
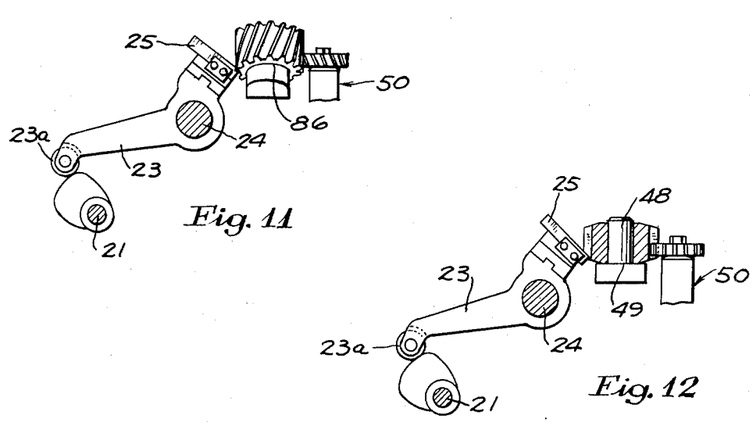
Fig. 12 is a view similar in part to Fig. 9 and showing a set-up for chamfering a spur gear with conical faces.

To chamfer spiral gears, both right-hand and left-hand spirals, the axis of the work arbor is tilted in relation to the axis of the index spindle, and the cutter path, see Figs. 10 and 11. The tilt is roughly ⅔ of the spiral angle of the work gear, that is, 12° tilt for an 18° spiral gear and 13⅓° tilt for a 20° spiral gear. It is a long mathematical procedure to compute exactly the most desirable tilt for a specific spiral gear, and explanation of details of such a procedure is not believed to be necessary herein.

In chamfering spiral gears, the gear-receiving arbors 86, 87 and 88 of the fixtures 90, 91 and 92 are tilted, such as shown in Figs. 5, 6 and 8, and Figs. 10 and 11. Since the axis of the arbor is tilted in relation to the axis of the index spindle, the spiral tooth angle of the index gear is equal to the spiral tooth angle of the work gear plus the tilt angle. Thus, if the work gear has an 18° right-hand spiral, the index gear will have a 30° left-hand spiral if the tilt is 12°. For right-hand spiral work gears it is desirable to have the left-hand spiral pilot gear turned in a counter-clockwise direction to prevent work gear from rising during indexing. For the same reason a right-hand spiral pilot gear having a clock-wise direction is used for a work gear that has a left-hand spiral.

Since the pilot gear normally rotates in a clock-wise direction, a reversing switch is used to change the direction of rotation of the electric motor in order that the pilot gear will rotate in a counter-clockwise direction. This means that the relief cam must be changed or reversed when pilot gear is rotated counter-clockwise.

In the improved machine disclosed herein only the minimum number of parts are indexed, namely, the indexing gear or plate, indexing spindle and indexing pilot gear. The parts are made durable but as light as possible in order that they can be rapidly indexed without undue strain on the machine that could cause excessive wear.

By virtue of the construction disclosed above, the objects of the present invention listed above and numerous added advantages are attained.

We claim:

1. In a machine for chamfering end edges of toothed machine elements of various dimensional specifications with each such element being received and operated upon by positively located non-adjustable means as in a special machine receiving only a predetermined element, said machine comprising a permanent structure and a number of changeable portions each received in one non-adjustable position, a frame structure, a drive shaft on said frame structure, a hinged arm actuated from said drive shaft to oscillate through a predetermined angle, said shaft and arm forming a permanent portion of the machine, said arm being adapted to receive and to actuate a pair of spaced cutters predesigned for a predetermined work gear to be chamfered, said frame structure receiving to be assembled thereto a predesigned fixture adapted to receive and to locate a work gear of said predetermined dimensional specifications and to locate said work gear in such space relation to the cutters that each of said cutters produces a substantially uniform chamfer on at least portions of two meeting tooth edges of each of two spaced teeth of the work gear, a second shaft perpendicular to said first shaft, and indexing means driven from said second shaft and forming a permanent portion of the machine, said indexing means including a changeable pilot gear for meshing with the work gear for indexing the same, said indexing means being manually adjustable to bring said pilot gear in mesh for proper tooth rolling action with the work gear.

2. The construction defined in claim 1, said indexing means being adapted to receive pilot gears of various dimensional specifications.

3. The construction defined in claim 1, said indexing means including an arbor having one end adapted to receive pilot gears of various dimensional specifications, with its lower end carrying an indexing gear, and means resiliently supporting the pilot gear end of said arbor to provide for self-adjustment of the distance between the centers of the pilot gear and a work gear element.

4. The machine defined in claim 1 and including slide means provided on the frame, with the indexing means being mounted on said slide means for sliding, and a manually operated screw for selectively fixing said indexing means on said sliding means and for releasing said indexing means for adjustment, said adjustment being effective only to provide for proper rolling action between the pilot gear and the tooth work element.

5. In a machine for chamfering end edges of toothed machine elements of various dimensional specifications with each such element being received and operated upon by positively located non-adjustable means as in a special machine receiving only a predetermined element, said machine comprising a permanent structure and a number of changeable portions each received by said permanent structure in one non-adjustable position, with said permanent structure including a frame, an arm hingedly mounted on said frame to oscillate through a predetermined angle, locating means on said arm corresponding to locating means on cutter blocks, said cutter blocks adapted to receive two spaced cutters separated by a distance equal to that of at least one intervening tooth of the particular work element, with the cutting edges of said cutters being positively and non-adjustably pre-positioned with respect to said cutter blocks and said arm, and designed to suit the dimensional specifications of the particular work element; said frame receiving in one non-adjustable location a work-holding fixture pre-designed to suit dimensional specification of the work element to be chamfered and so located with respect to the cutting edges of the cutter that each of said cutters cuts a substantially uniform chamfer of predetermined depth and angle on at least portions of two meeting tooth edges of the work element; and indexing means forming a permanent portion of the machine but manually adjustable to bring a changeable gear into mesh with the work element for proper tooth rolling action, with said cutters being pre-assembled on a holding block, with said oscillating arm being adapted to receive said block in only one operative position, and the machine structure being adapted to receive the work-receiving fixture in only one operative position, with the work gear loaded into said fixture being thus located in a predetermined position to said cutters and the chamfering movement thereof.

6. In a gear chamfering machine of the character described and including an index spindle; driving means provided on one end of said spindle for driving said spindle with the other end of the spindle being adapted to receive a pilot gear for driving the same, said pilot gear meshing with a work gear; bearings provided at both ends of said spindle, the bearing at the pilot gear end of said spindle being mounted in a bearing recess having a clearance on the side thereof away from the work gear, a surface in said recess on the side thereof toward the work gear, said surface adapted to serve as an abutment for the bearing and determining the closest position of said bearing and of said pilot gear with respect to the work gear, and resilient means on the opposite side of said recess holding said bearing against said abutment surface but adapted to yield and thus to provide for movements of the bearing away from said surface and, therefore, movements of the pilot gear away from the work gear when variations in the work gear result in an increase of the distance between the axes of the meshing work gear and pilot gear and when rotation of the work gear having such variation causes undesirable pressure on the pilot gear transversely of the axis thereof.

7. In a machine for chamfering end edges of toothed machine elements of various dimensional specifications with each such element being received and operated upon by positively located non-adjustable means as in a special machine receiving only a predetermined element, said machine comprising a permanent structure and a number of changeable portions each received in one non-adjustable position, with said permanent structure including a frame, an arm hingedly mounted on said frame to oscillate through a predetermined angle, locating means on said arm corresponding to locating means on cutter blocks, said cutter blocks adapted to receive two spaced cutters separated by a distance equal to that of at least one intervening tooth of the particular work element, with the cutting edges of said cutters being positively and non-adjustably pre-positioned with respect to said cutter blocks and said arm and designed to suit the dimensional specifications of the particular work element; said frame receiving in one non-adjustable location a work-holding fixture pre-designed to suit dimensional specification of the work element to be chamfered and so located with respect to the cutting edges of the cutter that each of said cutters cuts a substantially uniform chamfer of predetermined depth and angle on at least portions of two meeting tooth edges of the work element; and indexing means forming a permanent portion of the machine but manually adjustable to bring a changeable pilot gear into mesh with the work element for proper tooth rolling action; said cutters being pre-assembled on a holding block, with said swinging arm being adapted to receive said block in only one operative position, and the machine structure being adapted to receive the work-receiving fixture also in only one operative position, with the work gear loaded into said fixture being thus located in a predetermined position to said cutters and the chamfering movement thereof, said indexing means being adapted to receive pilot gears of varying dimensional specifications.

References Cited in the file of this patent

UNITED STATES PATENTS

| | | |
|---|---|---|
| 1,749,704 | Hoke | Mar. 4, 1930 |
| 1,975,151 | Hill | Oct. 2, 1934 |
| 2,433,201 | Cross | Dec. 23, 1947 |
| 2,668,480 | Christman | Feb. 9, 1954 |